United States Patent
Tolinski et al.

(10) Patent No.: US 6,866,335 B2
(45) Date of Patent: Mar. 15, 2005

(54) EXTERIORLY LOCATED MOTOR FOR SUNROOF

(75) Inventors: Roch J. Tolinski, Howell, MI (US); Steven J. Engelgau, Royal Oak, MI (US)

(73) Assignee: Meritor Light Vehicle Technology, LLC, Troy, MI (US)

( * ) Notice: Subject to any disclaimer, the term of this patent is extended or adjusted under 35 U.S.C. 154(b) by 326 days.

(21) Appl. No.: 09/876,519

(22) Filed: Jun. 7, 2001

(65) Prior Publication Data

US 2002/0185894 A1 Dec. 12, 2002

(51) Int. Cl.[7] ............................. B60J 7/047; B60J 7/22
(52) U.S. Cl. ................................. 296/217; 296/216.05
(58) Field of Search ....................... 296/216.04, 216.05, 296/217, 223, 91, 180.5

(56) References Cited

U.S. PATENT DOCUMENTS

| | | | | |
|---|---|---|---|---|
| 3,657,992 A | * | 4/1972 | Minnick, Jr. | |
| 4,063,774 A | * | 12/1977 | Hanks | 296/216.04 |
| 4,272,121 A | | 6/1981 | Kim | |
| 4,275,920 A | | 6/1981 | Pohl | |
| 4,787,665 A | * | 11/1988 | Rich | 296/180.1 |
| 5,464,267 A | * | 11/1995 | Racine et al. | 296/223 X |
| 5,988,839 A | * | 11/1999 | Pokorney et al. | 362/503 X |
| 6,305,740 B1 | * | 10/2001 | Staser et al. | 296/216.05 X |

FOREIGN PATENT DOCUMENTS

| | | | | |
|---|---|---|---|---|
| JP | 403045426 | * | 2/1991 | 296/216.05 |
| WO | 92004199 | * | 3/1992 | 296/216.04 |
| WO | WO 00/06404 | | 2/2000 | |

OTHER PUBLICATIONS

European Search Report EP02253964 Mar. 11, 2003.
European Search Report EP01309757 Mar. 11, 2003.

* cited by examiner

*Primary Examiner*—Dennis H. Pedder
(74) *Attorney, Agent, or Firm*—Carlson, Gaskey & Olds, PC

(57) ABSTRACT

A sunroof assembly is provided for securing to an exterior surface of a vehicle roof. The vehicle roof has exterior and interior surfaces. Opposing rails are secured to opposing sides of the exterior surface of the vehicle roof. A sunroof is supported between the rails and is movable between closed and opened positions with the sunroof disposed in a sunroof opening in the closed position. A housing, which is preferably a portion of a deflector, is secured to the exterior of the vehicle roof. In the preferred embodiment which incorporates a deflector, the deflector is secured between the opposing rails. A drive motor is disposed in the housing for moving the sunroof between the closed and opened positions. At least one drive element interconnects the drive motor and the sunroof. Since the drive motor and housing are located exteriorly on the vehicle roof, the sunroof assembly may be installed as a single unit and multi-piece drive elements are unnecessary.

15 Claims, 1 Drawing Sheet

EXTERIORLY LOCATED MOTOR FOR SUNROOF

BACKGROUND OF THE INVENTION

This invention relates to a sunroof assembly for a vehicle, and more particularly, the invention relates to a motor for driving the sunroof of the sunroof assembly.

Sunroof assemblies are desirable features for vehicle consumers. A sunroof is driven between open and closed positions to provide ventilation, increased sunlight, or access to the vehicle. Sunroof assemblies are typically rather small and are located above the driver's and forward passenger's seat of the vehicle. Prior art sunroof assemblies have used a drive motor located in the interior of the vehicle to drive the sunroof between the open and closed positions.

Recent sunroof designs have become more complex in design and larger, which presents new problems for installing the sunroof assembly onto the vehicle at the factory. In particular, large sunroofs have been developed that are supported by rails secured to the exterior surface of the vehicle roof. Locating the drive motor for the sunroof assembly in the interior of the vehicle presents problems when the sunroof and rails are secured to the exterior of the vehicle. For example, the drive elements connecting the drive motor and the sunroof must somehow pass through the vehicle roof and be connected to one another. As a result, multi-piece drive elements may be necessary in which one piece of the drive element is pre-connected to the drive motor and another piece of the drive element is pre-connected to the sunroof. During assembly at the factory the drive motor and the sunroof may be separately connected to the vehicle. The pieces of the drive element must then be connected to one another so that the drive motor may then drive the sunroof between the closed and open positions. However, it is desirable to install the sunroof assembly as a single unit to simplify assembly of the sunroof onto the vehicle roof. Therefore, what is needed is a sunroof assembly which does not require multi-piece drive elements and which enables the drive motor and sunroof to be attached to the vehicle together.

SUMMARY OF THE INVENTION AND ADVANTAGES

The present invention provides a sunroof assembly for securing to an exterior surface of a vehicle roof. The vehicle roof has exterior and interior surfaces. Opposing rails are secured to opposing sides of the exterior surface of the vehicle roof. A sunroof is supported between the rails and is movable between closed and opened positions with the sunroof disposed in a sunroof opening in the closed position. A housing, which is preferably a portion of a deflector, is secured to the exterior of the vehicle roof In the preferred embodiment which incorporates a deflector, the deflector is secured between the opposing rails. A drive motor is disposed in the housing for moving the sunroof between the closed and opened positions. At least one drive element interconnects the drive motor and the sunroof. Since the drive motor and housing are located exteriorly on the vehicle roof, the sunroof assembly, including the motor, may be installed as a single unit and multi-piece drive elements are unnecessary.

BRIEF DESCRIPTION OF THE DRAWINGS

Other advantages of the present invention can be understood by reference to the following detailed description when considered in connection with the accompanying drawings wherein.

DETAILED DESCRIPTION OF THE PREFERRED EMBODIMENT

Figure 1:
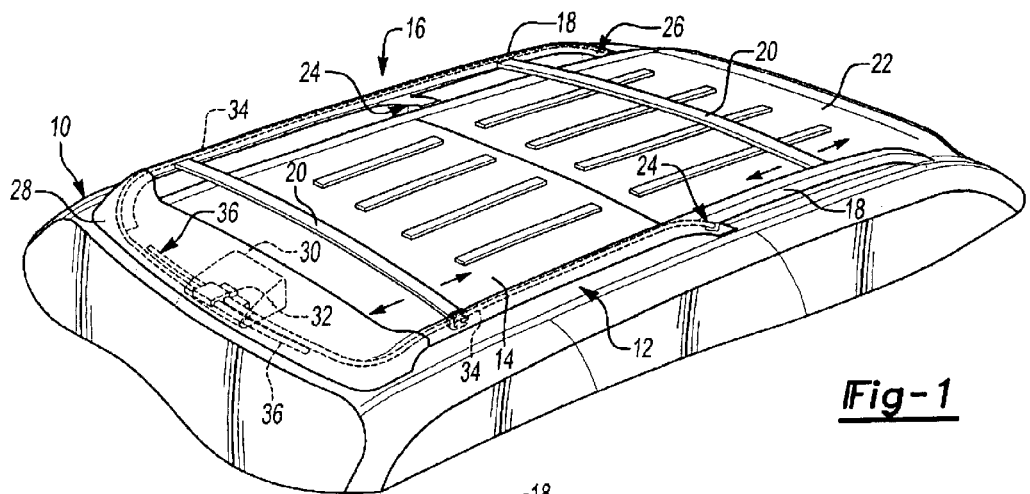
FIG. 1 is a perspective view of the present invention with the sunroof in a closed position.
Figure 2:
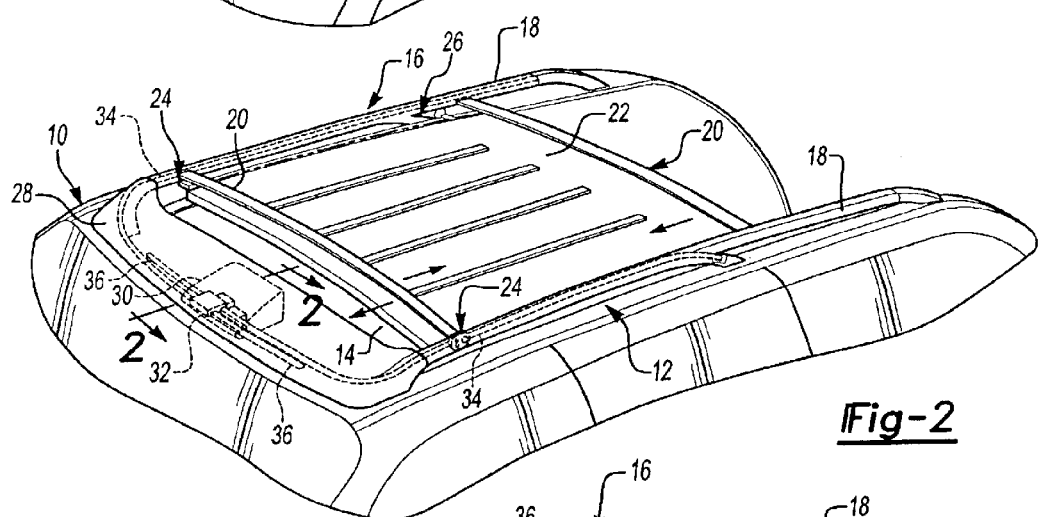
FIG. 2 is a perspective view of the sunroof assembly of the present invention with the sunroof in an open position.

A vehicle 10 is shown in FIGS. 1 and 2. The vehicle 10 includes a vehicle roof 12 having exterior surface 14. A sunroof assembly 16 is secured to the exterior surface 14, preferably as a single unit at the factory. By providing a sunroof assembly 16 that may be secured as a single unit to the vehicle 10, assembly of the vehicle is greatly simplified. The sunroof assembly 16 includes opposing rails 18 having roof bows 20 arranged therebetween. The roof bows 20 are typically used to support luggage on the exterior of the vehicle.

A sunroof 22 is supported between opposing rails 18 at forward connections 24 and rearward connections 26 (only one of which is visible in the figures). The sunroof 22 is movable between a closed position, shown in FIG. 1, and an open position, shown in FIG. 2. As can be seen in the Figures, the sunroof 22 is rather large and would be intrusive if contained in the interior vehicle when the sunroof 22 is in the open position. Preferably, the sunroof assembly 16 includes a deflector 28 to deflect wind away from the opening of the vehicle when the sunroof 22 is in the open position. Furthermore, the deflector 28 prevents debris from collecting between the sunroof 22 and the exterior surface 14 of the vehicle roof 12 when the sunroof 22 is in the open position, which would inhibit closing of the sunroof 22. Preferably, the deflector 28 is secured to a forward portion of the opposing rails 18.

The sunroof assembly 16 includes a housing 30, which is secured to the exterior surface 14. Preferably, the housing 30 is defined by a portion of the deflector 28. Most preferably, the housing 30 is integrally formed with the deflector 28 as a single unit. A drive motor 32 is disposed within the housing 30, and drive elements 34 interconnect the drive motor 32 and the sunroof 22. The drive elements 34 may be at least partially contained within the rails 18.

The sunroof assembly 16 also includes take-up tubes 36 for guiding and receiving the drive elements 34 as the sunroof 22 moves from the closed position to the open position. The take-up tubes 36 may be constructed from a metal tube, and are most preferably secured to and housed within the deflector 28.

Figure 3:
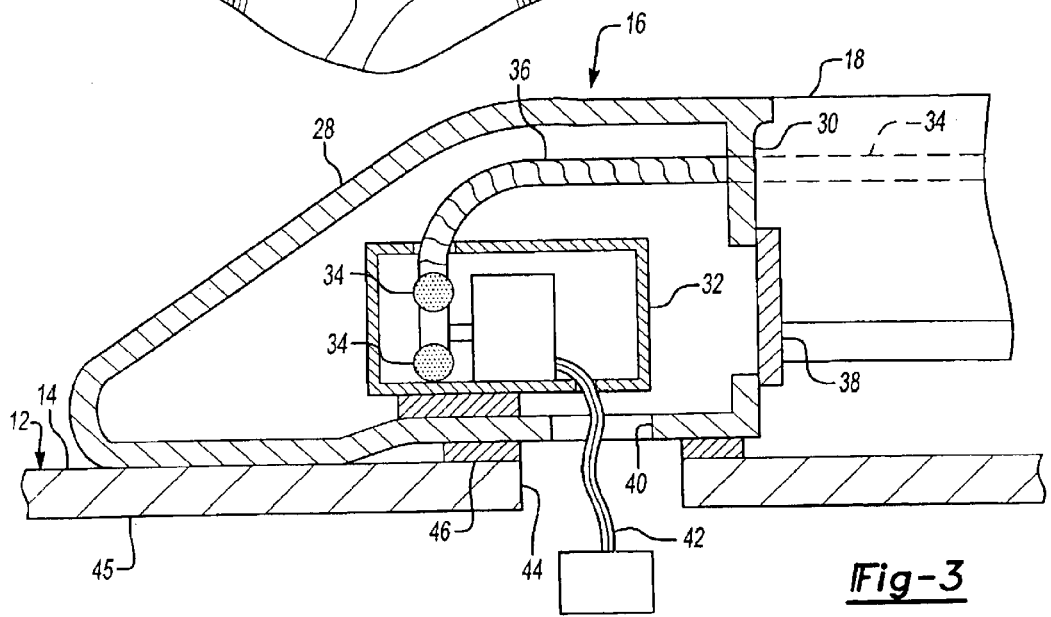
FIG. 3 is a cross-sectional view of a drive motor housing of the present invention.

Referring to FIG. 3, the housing 30 defines a cavity within which the drive motor 32 is arranged. The housing 30 may have an access panel 38 to provide access to the drive motor 32 for servicing. The housing 30 includes a hole 40 and a seal or gasket 46 arranged about the hole 40. The vehicle roof 12 has an opening 44 extending from the exterior surface 14 to an interior surface 45. The hole 40 of the housing 30 is aligned with the opening 44. The drive motor 32 includes leads 42 extending through the hole 40 and opening 44. In this manner, power may be provided from the interior of the vehicle to the drive motor 32.

As can be appreciated from the above description, the exteriorly located motor for the sunroof assembly permits the sunroof assembly to be assembled onto the vehicle as a single unit. Once the sunroof assembly is assembled onto the vehicle, power simply needs to be connected to the drive motor 32. Furthermore, the present invention permits a one-piece drive element 34 to be used between the drive motor 32 and the sunroof 22. Although two drive elements 34 are shown in the Figures on each side of the sunroof, any suitable number of drive elements may be used.

The invention has been described in an illustrative manner, and it is to be understood that the terminology that has been used is intended to be in the nature of words of description rather than of limitation. Obviously, many modifications and variations of the present invention are possible in light of the above teachings. It is, therefore, to be understood that within the scope of the appended claims the invention may be practiced otherwise than as specifically described.

What is claimed is:

1. A sunroof assembly for securing to an exterior surface of a vehicle roof, comprising:

opposing rails for securing to opposing sides of the exterior surface of the vehicle roof;

a sunroof supported between said rails movable between closed and open positions;

a drive motor moving said sunroof between said closed and open positions;

at least one drive element interconnecting said drive motor and said sunroof; and a deflector interconnecting said rails with a portion of said deflector defining a housing, said housing for securing to the exterior surface of the vehicle roof with said drive motor disposed in said housing with a take-up tube supported by said deflector and receiving a portion in said at least one drive element with said sunroof in said open position.

2. The assembly according to claim 1, wherein said deflector interconnects forward portions of said rails.

3. The assembly according to claim 1, wherein said housing includes a hole and said drive motor includes electrical leads extending through said hole for alignment with an opening in the exterior surface of the vehicle roof.

4. The assembly according to claim 3, further including a seal disposed about said hole for providing a water-tight seal between said housing and the exterior surface of the vehicle roof.

5. A sunroof assembly for securing to an exterior surface of a vehicle roof, comprising:

opposing rails for securing to opposing sides of the exterior surface to the vehicle roof;

a sunroof supported between said rails movable between closed and open positions;

a drive motor moving said sunroof between said closed and open positions;

at least one drive element interconnecting said drive motor and said sunroof; and a deflector interconnecting said rails with a portion of said deflector defining a housing, said housing for securing to the exterior surface of the vehicle roof with said drive motor disposed in said housing, wherein said housing includes an access panel for permitting access to said drive motor for servicing.

6. A vehicle having a sunroof opening, comprising:

a vehicle roof having exterior and interior surface including an opening there through;

opposing rails secured to opposing sides of said exterior surface of said vehicle roof;

a sunroof supported between said rails movable between closed and open positions with said sunroof disposed in the sunroof opening in said closed position;

a housing secured to said exterior surface of said vehicle roof and including a hole;

a drive motor disposed in said housing moving said sunroof between said closed and open positions, wherein said drive motor includes electrical leads extending through said hole and said opening; and at least one drive element interconnecting said drive motor and said sunroof.

7. The assembly according to claim 6, further including a deflector interconnecting said rails with a portion of said deflector defining said housing.

8. The assembly according to claim 7, further including a take-up tube supported by said deflector and receiving a portion of said at least one drive element with said sunroof in said open position.

9. The assembly according to claim 7, wherein said deflector interconnects forward portions of said rails.

10. The assembly according to claim 7, wherein said housing is integrally formed with said deflector with said deflector secured to said exterior of said vehicle roof.

11. The assembly according to claim 10, wherein said housing includes an access panel for permitting access of said drive motor for servicing.

12. The assembly according to claim 6, further including a seal disposed about said hole and said opening for providing a water-tight seal between said housing and said exterior surface of said vehicle roof.

13. A method of securing a sunroof assembly to a vehicle having a vehicle roof, comprising the steps of:

a) providing a sunroof supported between opposing rails;

b) securing the rails to a vehicle roof;

c) securing a sunroof drive housing to an exterior surface of the vehicle roof; and d) sealing an area between the sunroof drive housing and the exterior surface of the vehicle roof.

14. The method according to claim 13, wherein step c) includes securing a deflector to the exterior surface of the vehicle roof.

15. The method according to claim 13, further including the step of: e) running drive motor leads from an exterior of the vehicle to an interior of the vehicle.

* * * * *